United States Patent
Mansson et al.

(10) Patent No.: US 7,282,108 B2
(45) Date of Patent: Oct. 16, 2007

(54) METHOD FOR PRODUCING A MULTI-PLY WEB OF FLEXIBLE MATERIAL, SUCH AS PAPER AND NONWOVEN

(75) Inventors: Anna Mansson, Molndal (SE); Eva-Li Saarvali, Frolunda (SE); Anders Andersson, Stenungsund (SE)

(73) Assignee: SCA Hygiene Products AB, Gothenburg (SE)

( * ) Notice: Subject to any disclaimer, the term of this patent is extended or adjusted under 35 U.S.C. 154(b) by 304 days.

(21) Appl. No.: 10/669,440

(22) Filed: Sep. 25, 2003

(65) Prior Publication Data

US 2004/0062916 A1    Apr. 1, 2004

Related U.S. Application Data

(60) Provisional application No. 60/413,756, filed on Sep. 27, 2002.

(51) Int. Cl.
*B31F 1/07* (2006.01)
*B29C 59/04* (2006.01)
*B32B 7/14* (2006.01)

(52) U.S. Cl. .................. 156/209; 156/291

(58) Field of Classification Search .......... 156/209, 156/219, 291, 292; 428/198, 211.1, 154; 162/109
See application file for complete search history.

(56) References Cited

U.S. PATENT DOCUMENTS

| | | | | |
|---|---|---|---|---|
| 3,650,882 A | * | 3/1972 | Thomas | 428/154 |
| 4,325,768 A | * | 4/1982 | Schulz | 156/206 |
| 5,382,464 A | * | 1/1995 | Ruppel et al. | 428/172 |
| 5,736,223 A | | 4/1998 | Laurent | |
| 5,882,769 A | * | 3/1999 | McCormack et al. | 428/152 |
| 6,551,691 B1 | * | 4/2003 | Hoeft et al. | 428/172 |
| 6,599,614 B1 | * | 7/2003 | Roussel et al. | 428/172 |
| 6,802,932 B2 | * | 10/2004 | Kudo et al. | 156/322 |
| 2003/0198788 A1 | * | 10/2003 | Andersson et al. | 428/195.1 |
| 2003/0215602 A1 | * | 11/2003 | Andersson et al. | 428/116 |

FOREIGN PATENT DOCUMENTS

| | | |
|---|---|---|
| DE | 195 34 812 | 3/1997 |
| EP | 0 738 588 | 10/1996 |
| WO | WO99/45205 | * 9/1999 |

* cited by examiner

*Primary Examiner*—Richard Crispino
*Assistant Examiner*—Barbara J. Musser
(74) *Attorney, Agent, or Firm*—Young & Thompson

(57) ABSTRACT

Method for producing a multi-ply web comprising at least three plies of flexible material, such as paper and nonwoven material and a multi-ply product produced according to the method. A first and second ply are glued together with a first glue pattern and a second and third ply are glued together with a second glue pattern which, as seen in the thickness direction of the multi-ply web, is substantially aligned with the first glue pattern.

14 Claims, 3 Drawing Sheets

METHOD FOR PRODUCING A MULTI-PLY WEB OF FLEXIBLE MATERIAL, SUCH AS PAPER AND NONWOVEN

CROSS REFERENCE TO RELATED APPLICATION

This application claims the 35 U.S.C. 119(e) benefit of U.S. Provisional Application No. 60/413,756 filed on Sep. 27, 2002.

FIELD OF THE INVENTION

The present invention refers to a method for producing a multi-ply web comprising at least three plies of flexible material, such as paper and nonwoven material, by means of gluing the plies. Especially it refers to production of tissue products such as toilet and kitchen paper, paper towels, hand towels, napkins, handkerchiefs, wiping material and the like. The invention further refers to a multi-ply web of flexible material, such as paper and nonwoven, comprising at least three plies, which are interconnected by means of gluing in discrete glue sites.

BACKGROUND OF THE INVENTION

It is very common to laminate two or more tissue plies in order to produce the final tissue product. Herewith a more flexible and softer tissue product is obtained with a laminated product as compared to if one single ply with a corresponding thickness and basis weight had been produced. The absorbent capacity and the bulk are moreover improved.

The lamination of two or more tissue plies is often made by means of gluing. A mechanical embossing of the plies is also often performed before they are glued together. It is further known to laminate two plies only by means of a mechanical embossing, at which a mechanical joining of the plies occurs in the embossing sites.

Through for example EP-A-796 727 it is known to first emboss two paper plies in a three dimensional structure with alternating raised and recessed portions, after which glue is applied to one of the plies and the two plies are joined in a press nip between two embossing rolls, so that the raised portions of the respective plies are glued to each other. A similar embossing procedure is shown in EP-A-738 588, according to which the glue also has a colouring effect.

In WO 95/08671 there is enclosed an example of so called nested embossing, in which the two individually embossed plies are combined and joined with the raised portions of one ply nesting into the recessed portions of the opposite ply.

Through U.S. Pat. No. 5,443,889 there is known a procedure for laminating two paper plies, which are fed over a pattern roll each, said pattern rolls having alternating raised and recessed portions and where glue is applied to one ply while this is led over the roll. The two paper plies are then glued together in a nip between the two pattern rolls, which are in register with each other so that a joining and compression of the paper plies occurs in a pattern corresponding to the protuberances of the pattern rolls.

A drawback that occurs in connection with embossing a paper web where this is compressed in spots, is that a considerable strength reduction occurs in the embossing sites, which affects the strength properties of the entire paper product. Strength reductions of up to 70% of an embossed paper as compared to a corresponding non-embossed paper are not unusual.

U.S. Pat. No. 3,672,950 discloses a method for producing a quilted or cushioned adhesively laminated tissue product in which glue is applied in a certain pattern to one tissue ply in a press nip between a first pattern roll and an impression roll. This ply is laminated to another ply in a press nip between the same impression roll and a second pattern roll having a pattern corresponding with that of the first pattern roll and driven in registry with the first pattern roll. The two plies are in different conditions of stress during the lamination process, so that a quilted or cushioned product is provided.

Laminating three or more tissue plies together by gluing can be made in different ways. According to one alternative embodiment an embossing unit comprising two embossing nips defined by an embossing roll and a marrying roll providing a nested configuration of the embossed and laminated web and further comprising a glue applicator, as disclosed in for example U.S. Pat. No. 3,867,225, is used, with the modification that two plies are fed together into at least one of the embossing nips. Using this technique for laminating three or more plies gives a rather stiff product since the glue has to penetrate completely through the middle layer(s) in order to glue all layers together. An insufficient penetration of the glue through the middle layer(s) will not provide a sufficient ply-bonding effect. The problem will be even more pronounced with four or more plies.

According to an alternative embodiment three or more plies may be joined together by mechanical ply-bonding by so called male-to-flat or male-to-male embossing. The embossing is normally made only along the edge portions of the tissue product, so called edge embossing, as is disclosed in for example U.S. Pat. No. 1,774,497, but may also be made over the entire surface of the product. EP-A-436 170 discloses a multiply tissue product comprising at two or more plies that are individually embossed and laminated together by edge embossing. It is difficult to achieve a sufficient ply-bonding with mechanical embossing only, especially when only the edge portions are embossed.

In Swedish patent application no. 0201088-2 there is disclosed that three or more plies are joined together by gluing in a plurality of discrete glue sites, wherein a first and second ply of said multi-ply web are glued together in a first glue pattern comprising a plurality of spaced discrete glue sites and a third ply is glued to the combined first and second plies in a second glue pattern comprising a plurality of spaced discrete glue sites which are offset with the glue sites of said first glue pattern.

SUMMARY OF THE INVENTION

The object of the present invention is to provide a method for producing a multi-ply web of flexible material, such as paper and nonwoven, wherein at least three plies of flexible material are laminated together by gluing. The lamination should provide a good ply-bonding and be lenient to the material so that the structure of the plies is substantially maintained as well as its strength properties.

The absorbent capacity and bulk of the finished product should moreover be high as well as its drapability properties.

This has according to the invention been provided by bringing a first patterned glue transfer roll, having a three dimensional pattern of protuberances in contact with a first glue application device, and transfers glue to a first web shaped flexible material in a glue pattern corresponding to the configuration of the protuberances. A second web shaped flexible material is brought in contact with the glue applied side of said first web shaped flexible material, a second patterned glue transfer roll having a three dimensional pattern of protuberances, is brought in contact with a second glue application device, and transfers glue to one external side of the combined first and second web shaped flexible materials in a second glue pattern corresponding to the configuration of the protuberances of said second glue transfer roll. A third web shaped flexible material is brought in contact with the glue applied side of said combined first and second web shaped flexible materials in a press nip between a patterned lamination roll and an impression roll, said lamination roll having a three dimensional pattern of protuberances corresponding to the first and/or second glue patterns. The glue pattern of said second glue transfer roll is applied, as seen in the thickness direction of the multi-ply web, substantially aligned with the glue pattern applied by the first glue transfer roll, the lamination roll and the first and second glue transfer rolls are driven in registry with each other, so that the at least three plies of web shaped flexible material are pressed and glued together in a pattern corresponding to the aligned glue patterns.

In one embodiment only one lamination roll is provided which is arranged after the last (second) glue transfer roll and which is driven in registry with both said first and second glue transfer rolls.

In an alternative embodiment at least two lamination rolls are provided, wherein a first lamination roll is arranged after the first glue transfer roll, said first lamination roll having a three dimensional pattern of protuberances corresponding to the first glue pattern and is driven in registry with said first glue transfer roll to press and glue the second web shaped flexible material to the first web shaped flexible material in a pattern corresponding to the first glue pattern, and a second lamination roll is arranged after the second glue transfer roll to press and glue the third web shaped flexible material to the combined first and second web shaped flexible materials in a pattern corresponding to the aligned glue patterns.

Any of said web shaped flexible materials may comprise one or more plies of flexible material.

In one embodiment of the invention, at least one of the plies before lamination with the opposite ply is exerted to a three-dimensional patterning provided on the material while wet, during drying of the wet material and/or in dry state.

The size of each glue site preferably amounts to between 0.15 and 150 mm$^2$, preferably between 0.5 and 100 mm$^2$, more preferably between 1 and 15 mm$^2$. The number of glue sites per area unit should amount to between 25 per m$^2$ to 150 per cm$^2$, preferably between 300 per m$^2$ to 50 per cm$^2$ and more preferably between 800 per m$^2$ to 20 per cm$^2$. It is pointed out that the glue sites may be regularly distributed over the area of the web shaped material, but they may also be irregularly distributed, for example smaller sites arranged in groups spaced apart.

The glue sites can be of any optional shape, such as small points, lines, figures, letters, fantasy patterns etc.

The invention further refers to a multi-ply web of flexible material, such as paper and nonwoven, comprising at least three plies which are interconnected by gluing in a plurality of discrete glue sites, a first and second ply of said multi-ply web being glued together in a first glue pattern comprising a plurality of spaced discrete glue sites and a third ply glued to the combined first and second plies in a second glue pattern comprising a plurality of spaced discrete glue sites which, as seen in the thickness direction of the multi-ply web, are substantially aligned with the glue sites of said first glue pattern.

In one embodiment substantially all glue sites of the second glue pattern are applied aligned with the glue sites of the first glue pattern.

At least one glue pattern may be provided by a coloured glue.

According to one aspect of the invention the glue sites of the first and second glue patterns are different as to shape, size and/or colour. The glue sites of the first and second glue patterns may further when aligned in the thickness direction of the multi-ply web form a pattern, symbol, figure or the like.

The glues used in the first and second glue application devices may in one embodiment be different as to their chemical composition and/or physical properties, such as viscosity.

In one embodiment at least one of the plies has deliberately made holes therein. This will create a visual effect and an improved absorption. A coloured ply having holes therein may further create an appealing visual effect.

The multi-ply web may further be embossed after lamination.

According to one embodiment the multi-ply web comprises at least four plies glued together with at least a first and a second glue pattern aligned in the thickness direction of the web and that any edge embossing or other lamination than provided by said glue patterns is absent.

In the case of four or more plies at least three glue patterns each comprising a plurality of spaced discrete glue sites may be provided, said glue patterns being aligned in the thickness direction of said web.

Further features of the invention are disclosed in the following description and in the claims.

BRIEF DESCRIPTION OF THE DRAWINGS

The invention will in the following be closer described with reference to an embodiment shown in the accompanying drawings.

DETAILED DESCRIPTION OF THE INVENTION

Figure 1:
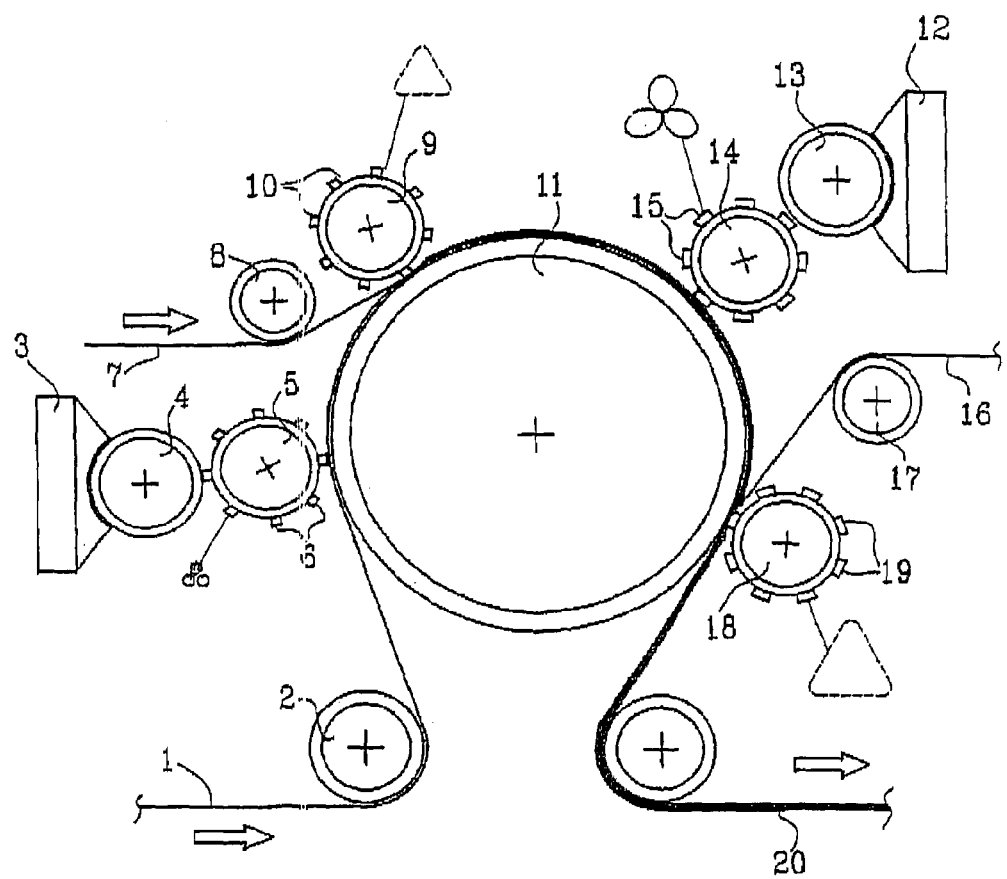
FIG. 1 shows a schematic side view of a device for performing the method according to the invention.

FIG. 1 shows a device for producing a three-ply material, e g paper, especially tissue paper. A first paper web 1 is fed over a roll 2 towards a glue application station. This comprises a glue chamber 3 from which glue is applied on a glue roll 4. The glue roll 4 is in contact with a first patterned glue transfer roll 5, which along its periphery is provided with a pattern of protuberances 6. The glue roll 4 is only contacting the tops of the protuberances 6, so that glue is only applied thereon. The paper web 1 is passed into a press nip between the first glue transfer roll 5 and a centrally placed impression roll 11. Glue will thus be applied to the first paper web 1 in a first glue pattern corresponding to the configuration of the tops of the protuberances 6. According to one embodiment the pressure in the press nip between the pattern roll 5 and the impression roll 11 is only sufficiently high to accomplish a transfer of glue to the paper web 1. However there should preferably be no deformation of the paper web, i e no impression of the protuberances 6 of the pattern roll 5 into the paper web will occur in such a case.

Figure 4:
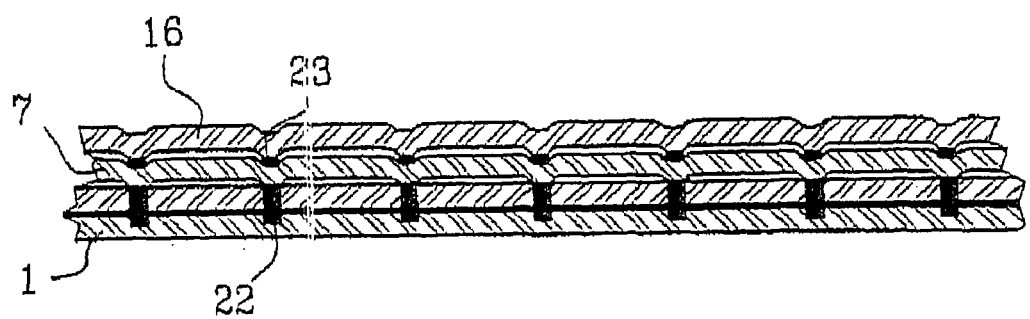
FIG. 4 is schematic cross section of a four-ply paper produced according to the method.

A second paper web 7 is fed over a roll 8 and into a press nip between a first pattered lamination roll 9 and the centrally placed impression roll 11. The first lamination roll 9 has a three dimensional pattern of protuberances 10 corresponding to the pattern of the first glue transfer roll 5. The term "corresponding to" in this respect means that the protuberances 10 either have the same shape and size of the effective surface area as the protuberances 6 of the first glue transfer roll 5, the same shape but a larger effective surface area than the protuberances 6 of the first glue transfer roll 5 so as to extend outside the outer circumference of the glue sites provided by the first glue transfer roll 5 or a different shape and a larger effective surface area than the protuberances 6 of the first glue transfer roll 5. For example a glue pattern provided by the first glue transfer roll 5 may be in the form of groups of three dots arranged in a triangular pattern 22 as shown in FIG. 4, wherein the protuberances 10 of the first lamination roll 9 may either be exactly the same as or slightly larger than the glue pattern, or may for example be in the form of a triangle 24 covering the three dots, as indicated with broken lines in FIG. 4. In all these cases the relative position of the pattern on the two patterned rolls 5 and 9 are in correspondence with each other.

The web tension of said first and second plies 1 and 7 are preferably substantially equal as they are fed into the second press nip. Herewith there will be no foreshortening effect from the lamination. The two patterned rolls 5 and 9 are driven in registry with each other so that the first and second paper webs 1 and 7 are pressed and glued together in a pattern corresponding to the configuration of the glue pattern provided by the first glue transfer roll 5.

It is preferred that one central impression roll 11 is used for both the first glue transfer roll 5 and lamination roll 9, as is shown in FIG. 1. However it would of course also be possible to use two or more separate impression rolls for the glue transfer roll 5 and the lamination roll 9, and to synchronize them so that they are driven in registry. Also in this second press nip the pressure should be low but sufficiently high to provide a sufficient gluing together of the two paper plies 1 and 7. The pressure in the second press nip should not be higher than to cause only slight compacting impressions 21 just opposite the glue sites in the second ply 7 facing the first lamination roll 9.

The thus laminated first and second plies 1 and 7 are then fed towards a second glue application station comprising a glue chamber 12 from which glue is applied on a glue transfer roll 13. The glue transfer roll 13 is in contact with a second patterned glue transfer roll 14, which along its periphery is provided with a pattern of protuberances 15. The second glue transfer roll 14 transfers glue to the external side of the second ply 7 in a third press nip in a second glue pattern corresponding to the configuration of the tops of the protuberances 15. The pressure in the press nip between the second glue transfer roll 14 and the impression roll 11 is only sufficiently high to accomplish a transfer of glue to the paper web 1. However there should preferably be no deformation of the paper web, i e no impression of the protuberances 15 of the glue transfer roll 14 into the paper web 7.

The second glue pattern is applied aligned with the first glue pattern applied by the first glue transfer roll 5. A third ply 16 is fed over a roll 17 and is brought in contact with the glue applied side of the second ply 7 in a fourth press nip between a second patterned lamination roll 18 having a three dimensional pattern of protuberances 19 corresponding to the pattern of the second glue transfer roll 14 and the impression roll 11. The term "corresponding to" in this respect is as defined above with respect to the first glue transfer roll 5 and lamination roll 9. The second glue transfer roll 14 and lamination roll 18 are in registry with each other, so that the third ply 16 is pressed and glued to the combined first and second plies 1 and 7 in a pattern 23 corresponding to the configuration of the tops of the protuberances 15 of said second glue transfer roll 14.

Also in this fourth press nip the pressure should be low but sufficiently high to provide a gluing together of the combined plies. The pressure in the press nip should not be higher than to cause only slight compacting impressions 21 just opposite the glue sites in the third ply facing the second glue transfer roll 9.

Figure 2:
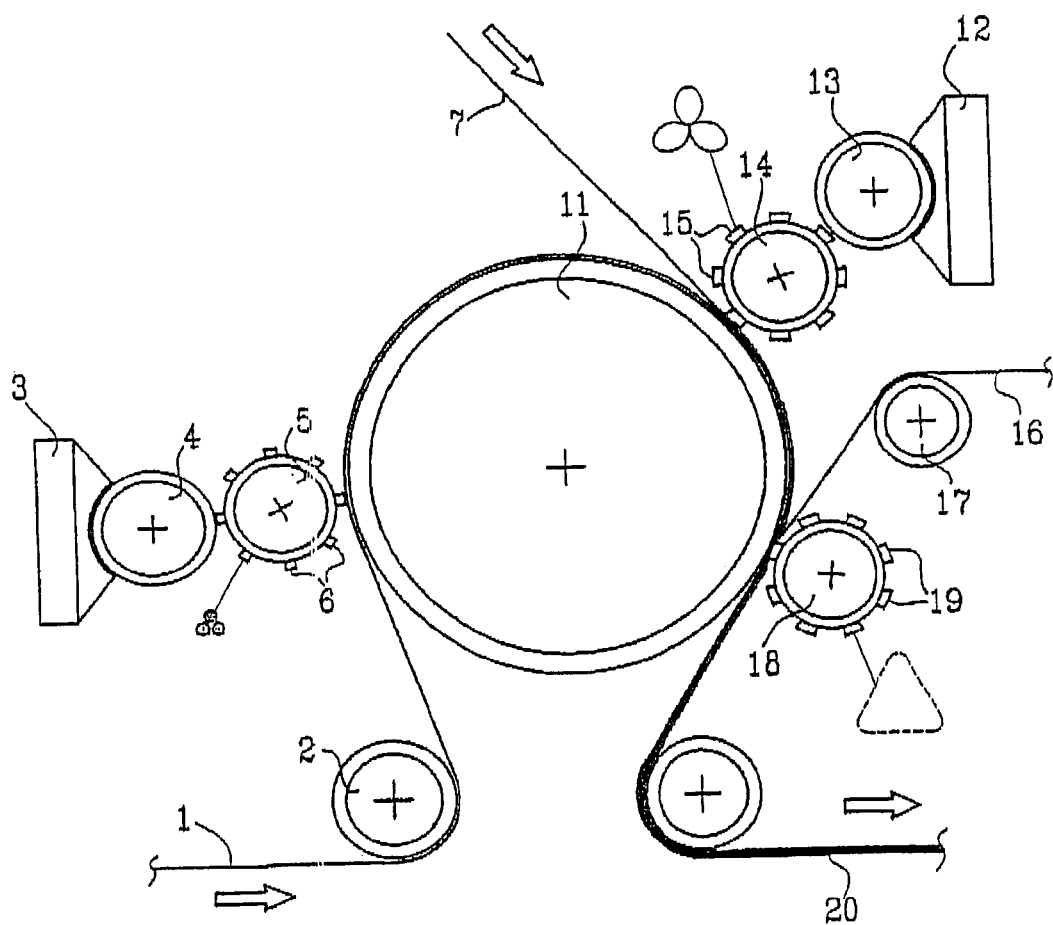
FIG. 2 shows a schematic side view of a device for performing the method according to an alternative embodiment of the invention.

In the embodiment shown in FIG. 2 the first lamination station has been eliminated and there is provided only one lamination roll 18 arranged after the second glue transfer roll 14. The shape and configuration of the protuberances 19 correspond to the aligned first and second glue patterns, so that the first, second and third plies 1, 7 and 16 will be pressed and glued together in the press nip between the lamination roll 18 and the impression roll 11. The protuberances 19 will preferably have an effective surface area that covers or extends slightly outside the perimeter of the aligned glue sites of the first and second glue patterns. In case one of the glue patterns is denser than the other glue pattern the protuberances 19 should be arranged with a corresponding density as the most dense glue pattern so as to exert substantially all glue sites to a pressing action from the lamination roll 18.

The surface of said multi-ply web facing the central impression roll 9 will substantially maintain its structure unaffected by the lamination process with no compacting impressions in the material opposite the glue sites. The laminated multi-ply product is denoted 20.

It is preferred that one central impression roll 11 is used for all pattern rolls 5, 9, 14 and 18, as is shown in FIG. 1 and 2. However it would of course also be possible to use two or more separate impression rolls for one or more of said pattern rolls, and to synchronize them so that they are driven in registry.

The pattern on the glue transfer rolls 5 and 13 can be optional, but should be chosen so that glue is applied to the paper web 1 in an amount corresponding to between 0.03 and 9%, preferably between 0.1 and 6% the total surface area of the paper web 1. In the present case the glue sites are sparsely distributed over substantially the entire area of the laminated product. It is with the method according to the invention possible to provide a very distinct positioning of the glue sites, wherein a very small amount of glue is needed. This means advantages with respect to softness, drapability, absorption etc. The number of glue sites per area unit should amount to between 25 per $m^2$ to 150 per $cm^2$, preferably between 300 per $m^2$ to 50 per $cm^2$ and more preferably between 800 per $m^2$ to 20 per $cm^2$. The size of each glue site should amount to between 0.15 and 150 $mm^2$, preferably between 0.5 and 100 $mm^2$ and more preferably between 1 and 15 $mm^2$.

In the case of large glue sites screened patterns can be used, which means that each glue pattern unit is built up of a plurality of small screen dots. The size of the glue site in this case is defined as the circumscribed area of the combination of screen dots forming a glue pattern unit.

Preferred glues are the ones commonly used for paper, such as carboxy methyl cellulose (CMC), polyvinyl alcohol (PVOH), ethylene vinyl acetate (EVA), polyvinyl acetate (PVAc), ethylene acrylic acid, vinyl acetate acrylic acid, styrene acrylic acid, polyurethane, polyvinylidene chloride, starch, chemically modified starch, dextrin, water soluble polymers such as latexes and milky colloids in which natural or synthetic rubber or plastic is suspended in water. In case the material webs are of other material than paper glues suited for these materials are of course chosen.

Coloured glues may also be used, which gives a visual effect and therewith a patterning effect to the material.

Figure 3:
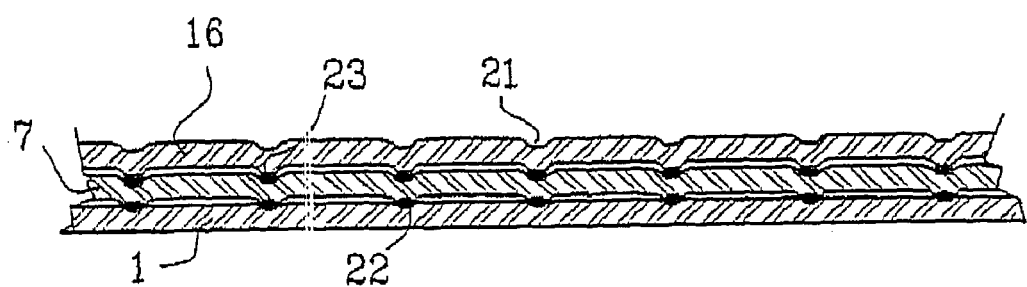
FIG. 3 is a schematic cross section of a three-ply paper produced according to the method.

In FIG. 3 there is shown an example of a three-ply paper produced according to the invention, at which the glue sites between the first and second plies 1 and 7 are denoted 22 and the glue sites between the second and third plies 7 and 16 are denoted 23. Between the glue sites 22 the paper plies 1 and 7 and between the glue sites 23 the paper plies 7 and 16 are free and not attached to each other and void volumes are created which increase the bulk and absorption capacity of the material, properties that are important for e g soft and absorbent paper. Substantially the entire bulk from the separate plies is maintained after the lamination. The second ply 7 and the third ply 16 can just opposite the glue sites 22 and 23 respectively have slight compacting impressions 21 and 23 caused by the pattern rolls 9 and 18 respectively.

Figure 5:
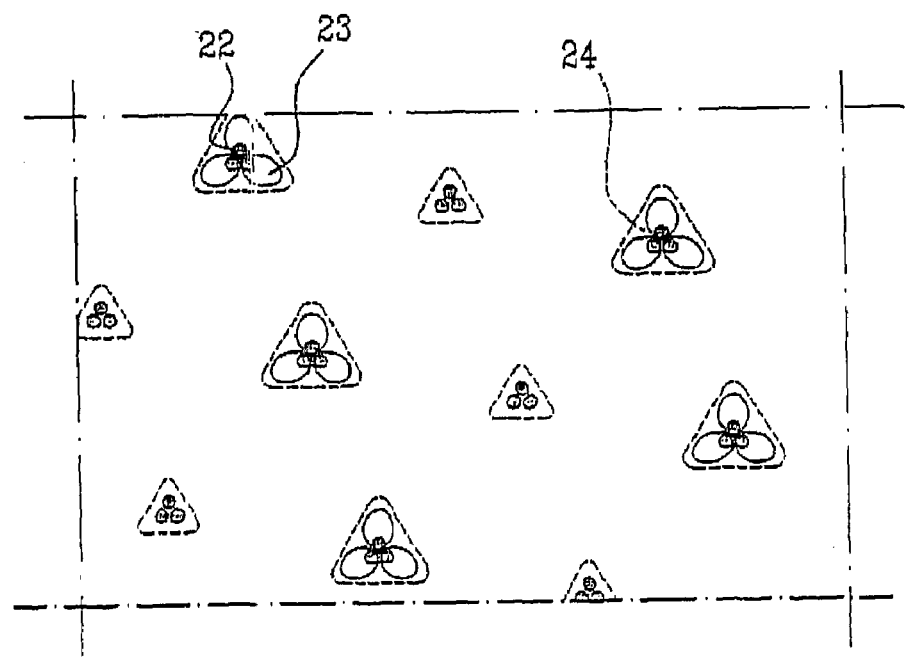
FIG. 5 is a plan view of two glue patterns, which are applied aligned in the thickness direction of the multi-ply web.

FIG. 5 shows an example of first and second glue patterns, wherein the glue sites 23 of the second glue pattern are arranged aligned with the glue sites 22 of the first glue pattern. The term "aligned" means that, as seen in the thickness direction of the web, i.e. a direction substantially perpendicular to the plane of the web, the glue sites of the two glue patterns are located just opposite each other or at least are overlapping, meaning that at least part of the surface areas of a pair of aligned glue sites are overlapping.

In case the first and second glue patterns are of the same density preferably substantially all glue sites 23 of the second glue pattern are applied aligned with respect to the respective glue sites 22 of the first glue pattern. "Substantially all" means that at least 90% of the glue sites 23 of the second glue pattern are aligned with glue sites 22 of the first glue pattern.

In case the first and second glue patterns are of different density meaning that one glue pattern is more sparse than the other glue pattern, substantially all, meaning at least 90%, of the glue sites of the more sparse glue pattern are aligned with glue sites of the more dense glue pattern.

The individual glue sites of the first and second glue patterns 22 and 23 may be identical or different as to shape, size and/or colour. A high freedom in creating appealing designs may be provided by having superposing glue patterns that in some aspect are different. The glue sites of the two glue patterns may for example in combination provide an optional pattern, symbol, figure or the like. This is illustrated in FIG. 5.

By placing the glue patterns in alignment with each other a very strong and effective ply-bonding effect is achieved. Edge embossing of the tissue product for ply-bonding reasons can be eliminated since the ply-bonding effect provided by the aligned glue patterns will be sufficient. Edge embossing is used in many conventional multi-ply tissue products in order to increase the ply-bonding.

The paper webs 1, 7 and 16 that are laminated can be either smooth but also have a three-dimensional structure provided earlier in the process, for example during forming, dewatering and/or drying of the paper web. A three-dimensional structure may also be provided by embossing the dry paper webs before lamination. The method according to the invention is very lenient to such a pattern, so that this is maintained substantially intact throughout the laminating process. Another important advantage of the invention is that the paper substantially maintains its strength properties through the process, which in many other lamination processes, in which an embossing and deformation of the paper webs occur in connection with lamination, are decreased. Because of the substantially smooth structure of the laminated multiply product this can be converted into dense rolls or folded products, which means space- and cost saving. The laminated multiply product may also, if desired, due to the strong ply bonding provided by the glue spots, be embossed after the lamination process, thereby creating a softer material. The effective ply bonding is achieved due to the distinct gluing effect provided by the first and second lamination rolls 9 and 18 driven in registry with the respective glue transfer rolls 5 and 14 respectively.

Four or more paper plies may of course be laminated. In one alternative three or more glue stations are arranged to apply glue patterns, which are aligned with respect to the previous and/or the subsequent glue pattern. In a further alternative two or more plies may enter the first, second and/or third press nips, wherein four or more plies may be laminated in two glue stations. When entering two or more plies into a glue station, the glue must penetrate into both or all layers. This is illustrated in FIG. 4 and may be accomplished by choosing a glue with appropriate properties, for example with respect to viscosity.

When laminating together four or more plies it has with conventional technique been necessary to edge emboss the tissue product in order to provide a sufficient ply-bonding effect. By using the technique according to the present invention the edge embossing or any additional lamination can be eliminated also with four or more plies present and while still providing a sufficient ply-bonding effect. The glue sites joining the different layers to each other should be aligned in the thickness direction of the multi-ply web. With four or more plies present in the multiply web there may be provided three or more glue patterns, at least two of which are aligned in the thickness direction of the web. Preferably three or all glue patterns are aligned in the thickness direction. Alternatively, as is seen in FIG. 4, at least one glue pattern may join three layers together by penetrating through the intermediate layer.

Glues with different properties with respect to for example viscosity may be used in the different glue stations. When the glue shall penetrate into two or more layers, as illustrated in FIG. 4, a glue having a lower viscosity is preferably used. Different glue may also be used when laminating plies of different material.

Different kind of paper with different properties with respect to absorption capacity, basis weight, manufacturing technique, fiber composition, chemical additives may be used in the different plies.

The method is further suitable to use for paper plies having deliberately made holes therein, since the main part of the holes will be intact throughout the lamination process and not be filled with glue, which normally is the case when gluing the plies together. The term "deliberately made holes" means holes that have been made by mechanical perforation or holes that have been made in connection with forming and/or drying the paper web.

The invention claimed is:

1. Method for producing a multi-ply web having at least three plies of flexible material, which comprises:

bringing a first patterned glue transfer roll, having a three dimensional pattern of protuberances, in contact with a first glue application device;

transferring glue to a first web shaped flexible material in a glue pattern of discrete glue sites corresponding to the configuration of the protuberances, the first web shaped flexible material being in contact with an impression roll during the transfer;

bringing a second web shaped flexible material in contact with the glue applied side of said first web shaped flexible material;

bringing a second patterned glue transfer roll having a three dimensional pattern of protuberances in contact with a second glue application device;

transferring glue to one external side of the combined first and second web shaped flexible materials in a second glue pattern of discrete glue sites corresponding to the configuration of the protuberances of said second glue transfer roll;

bringing a third web shaped flexible material in contact with the glue applied side of said combined first and second web shaped flexible materials in a press nip between a patterned lamination roll and the impression roll, said lamination roll having a three dimensional pattern of protuberances corresponding to at least one of the first and second glue patterns, wherein the glue pattern of said second glue transfer roll is applied, as seen in the thickness direction of the multi-ply web, substantially aligned with the glue pattern applied by the first glue transfer roll, and the lamination roll and the first and second glue transfer rolls are driven in registry with each other, so that the at least three plies of web shaped flexible material are pressed and glued together in a pattern corresponding to the aligned glue patterns, and wherein the first web shaped flexible material remains in contact with the impression roll when each of the second and third web shaped flexible materials are combined with the first web shaped flexible material.

2. The method as claimed in claim 1, wherein only one lamination roll is provided which is arranged after the second glue transfer roll.

3. The method as claimed in claim 1, wherein a first lamination roll and a second lamination roll are provided, the first lamination roll being arranged after the first glue transfer roll having a three dimensional pattern of protuberances corresponding to the first glue pattern and being driven in registry with said first glue transfer roll to press and glue the second web shaped flexible material to the first web shaped flexible material in a pattern corresponding to the first glue pattern, and a second lamination roll being arranged after the second glue transfer roll to press and glue the third web shaped flexible material to the combined first and second web shaped flexible materials in a pattern corresponding to the aligned glue patterns.

4. The method as claimed in claim 1, wherein any of said web shaped flexible materials comprises one or more plies of flexible material.

5. The method as claimed in claim 1, wherein at least one of the web shaped flexible materials before lamination with the other web shaped materials is exerted to a three dimensional patterning provided on the material while wet, during drying of the wet material and/or in dry state.

6. The method as claimed in claim 1, wherein substantially all glue sites of the second glue pattern are applied aligned with the glue sites of the first glue pattern.

7. The method as claimed in claim 1, wherein the size of each glue site amounts to between 0.15 and 150 mm$^2$.

8. The method as claimed in claim 1, wherein the number of glue sites per unit area amounts to between 25 per m$^2$ to 150 per cm$^2$.

9. The method as claimed in claim 1, wherein the glue sites of the first and second glue patterns are different as to shape, size and/or colour.

10. The method as claimed in claim 9, wherein the glue sites of the first and second glue patterns when aligned in the thickness direction of the multi-ply web form a pattern, symbol, or figure.

11. The method as claimed in claim 1, wherein the glues used in the first and second glue application devices are different, as to at least one of chemical composition and physical properties.

12. The method as claimed in claim 1, further comprising embossing the multiply web after lamination.

13. A method for producing a multi-ply web having at least three plies of flexible material, comprising:

bringing a first patterned glue transfer roll, having a three dimensional pattern of protuberances, in contact with a first glue application device;

transferring glue to a first nonembossed web shaped flexible material in a glue pattern of discrete glue sites corresponding to the configuration of the protuberances;

bringing a second non-embossed web shaped flexible material in contact with the glue applied side of said first web shaped flexible material, without substantially deforming the first and second web shaped flexible materials;

bringing a second patterned glue transfer roll having a three dimensional pattern of protuberances in contact with a second glue application device;

transferring glue to one external side of the combined first and second web shaped flexible materials in a second glue pattern of discrete glue sites corresponding to the configuration of the protuberances of said second glue transfer roll;

bringing a third non-embossed web shaped flexible material in contact with the glue applied side of said combined first and second web shaped flexible materials in a press nip between a patterned lamination roll and an impression roll, without substantially deforming said first through third web shaped flexible materials, said lamination roll having a three dimensional pattern of protuberances corresponding to at least one of the first and second glue patterns, wherein the glue pattern of said second glue transfer roll is applied, as seen in the thickness direction of the multi-ply web, substantially aligned with the glue pattern applied by the first glue transfer roll, and the lamination roll and the first and second glue transfer rolls are driven in registry with each other, so that the at least three plies of web shaped flexible material are pressed and glued together in a pattern corresponding to the aligned glue patterns.

14. A method for producing a multi-ply web having at least three plies of flexible material, comprising:

bringing a first patterned glue transfer roll, having a three dimensional pattern of protuberances, in contact with a first glue application device;

transferring glue to a first web shaped flexible material in a glue pattern of discrete glue sites corresponding to a configuration of each of the protuberances, the first web shaped flexible material being in contact with an impression roll during the transfer;

bringing a second web shaped flexible material in contact with the glue applied side of said first web shaped flexible material;

bringing a second patterned glue transfer roll having a three dimensional pattern of protuberances in contact with a second glue application device;

transferring glue to one external side of the combined first and second web shaped flexible materials in a second glue pattern of discrete glue sites corresponding to a configuration of each of the protuberances of said second glue transfer roll; and bringing a third web shaped flexible material in contact with the glue applied side of said combined first and second web shaped flexible materials in a press nip between a patterned lamination roll and the impression roll, said lamination roll having a three dimensional pattern of protuberances corresponding to at least one of the first and second glue patterns, wherein the glue pattern of said second glue transfer roll is applied, as seen in the thickness direction of the multi-ply web, substantially aligned with the glue pattern applied by the first glue transfer roll, to form a third pattern without substantially altering the first and second glue patterns, and wherein the first web shaped flexible material remains in contact with the impression roll when each of the second and third web shaped flexible materials are combined with the first web shaped flexible material.

* * * * *